United States Patent [19]

Armstrong

[11] Patent Number: 4,764,895
[45] Date of Patent: Aug. 16, 1988

[54] DATA PROCESSOR FOR CHANGING THE SEQUENTIAL FORMAT OF INPUTTED RECORDS

[76] Inventor: Philip N. Armstrong, 18 Elk Run, Monterey, Calif. 93940

[21] Appl. No.: 862,142

[22] Filed: May 12, 1986

[51] Int. Cl.[4] ............................................. G06F 12/02
[52] U.S. Cl. .................................................. 364/900
[58] Field of Search ... 364/200 MS File, 900 MS File; 370/99

[56] References Cited

U.S. PATENT DOCUMENTS

| | | | |
|---|---|---|---|
| 4,388,696 | 6/1983 | Test | 364/900 |
| 4,521,858 | 6/1985 | Kraemer et al. | 364/200 |
| 4,553,133 | 11/1985 | Peterson et al. | 340/347 DD |
| 4,559,620 | 12/1985 | Blair | 367/78 |
| 4,686,670 | 8/1987 | Kessels | 370/68 |
| 4,727,511 | 2/1988 | Sekiguchi | 364/900 |

Primary Examiner—Raulfe B. Zache
Assistant Examiner—A. Mohamed
Attorney, Agent, or Firm—Keith D. Beecher

[57] ABSTRACT

A format-changing data processing system is capable of storing successive input records (data words) in a random access memory and of retrieving the data words from the memory in accordance with predetermined instructions to produce the data words at the output of the system in a sequence having a changed sequential format as compared with the sequence of the input words. In a preferred embodiment of the system the instructions are stored in a second memory, and the data words flow into and out of the system simultaneously, and into and out of first and third memories, with the output words having a sequential format which is different from the sequence of input words, as established by the instructions in the second memory.

6 Claims, 2 Drawing Sheets

4,764,895

DATA PROCESSOR FOR CHANGING THE SEQUENTIAL FORMAT OF INPUTTED RECORDS

BACKGROUND OF THE INVENTION

The need to change the format of a sequence of words arises in many numerical computations to be performed by a computer; and this need also arises in such computer operations as printing and sorting.

SUMMARY OF THE INVENTION

The present invention provides a data processing system for changing the format of a sequence of words on a serial input/serial output basis, without interruptions, and more rapidly than is possible with single processor computers.

DETAILED DESCRIPTION OF THE ILLUSTRATED EMBODIMENT

Figure 1:
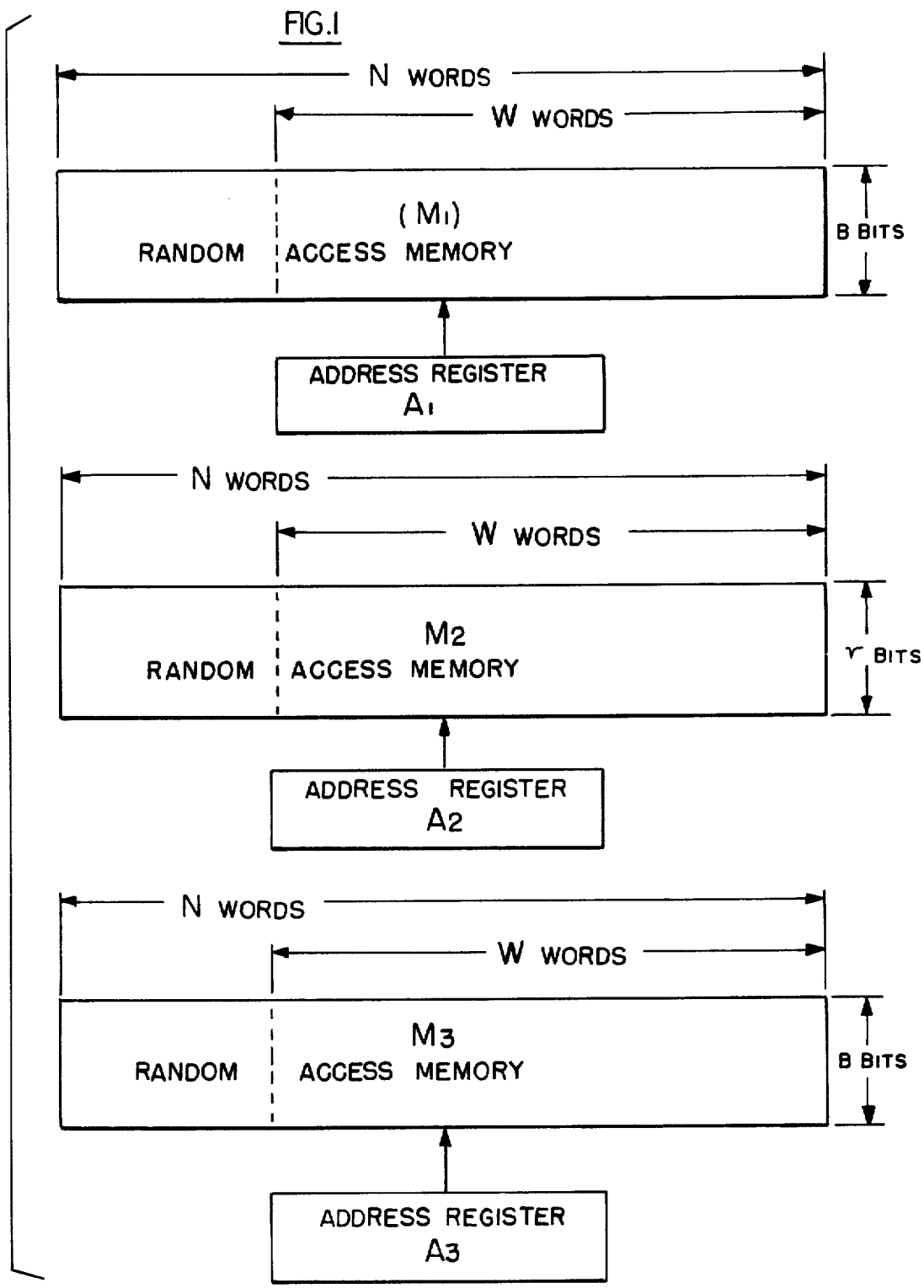
FIG. 1 is a block diagram of a number of random access memories and associated address registers which are used in the embodiment of the invention to be described.

The format changing data processing system of the invention, in the embodiment to be described, includes three random access memories which are denoted $M_1$, $M_2$ and $M_3$ in FIG. 1. The memories $M_1$ and $M_3$ are used to store data words, and the memory $M_2$ is used to store instructions relating to format changes which are to take place between the input data words and the output data words.

The memories $M_1$, $M_2$ and $M_3$ each have the capacity to store N words. During the operation of the system, W data words are stored in each of the memories $M_1$ and $M_3$ (where W is equal or less than N). Memories $M_1$ and $M_3$ are identical, and each of the data words stored in either of the memories $M_1$ or $M_3$ is assumed to have B bits. Each instruction stored in memory $M_2$ has r bits, where r is greater than or equal to $\log_2(N)$. Address registers $A_1$, $A_2$ and $A_3$ are respectively connected to the random access memories $M_1$, $M_2$ and $M_3$.

In operation, data words pass simultaneously into and out of the format changing data processing system of the invention. The $i^{th}$ word passing into the data processing system of the invention is stored in the location i of either memory $M_1$ or $M_3$; and, simultaneously, the $i^{th}$ word to pass from the system is retrieved from the address $a_i$ of the other memory. When all of the W words originally stored in memory $M_3$ have passed out of the data processing system, for example, system, for example, there will be new W words stored in memory $M_1$, and the roles of the two memories will then be exchanged.

Figure 2:
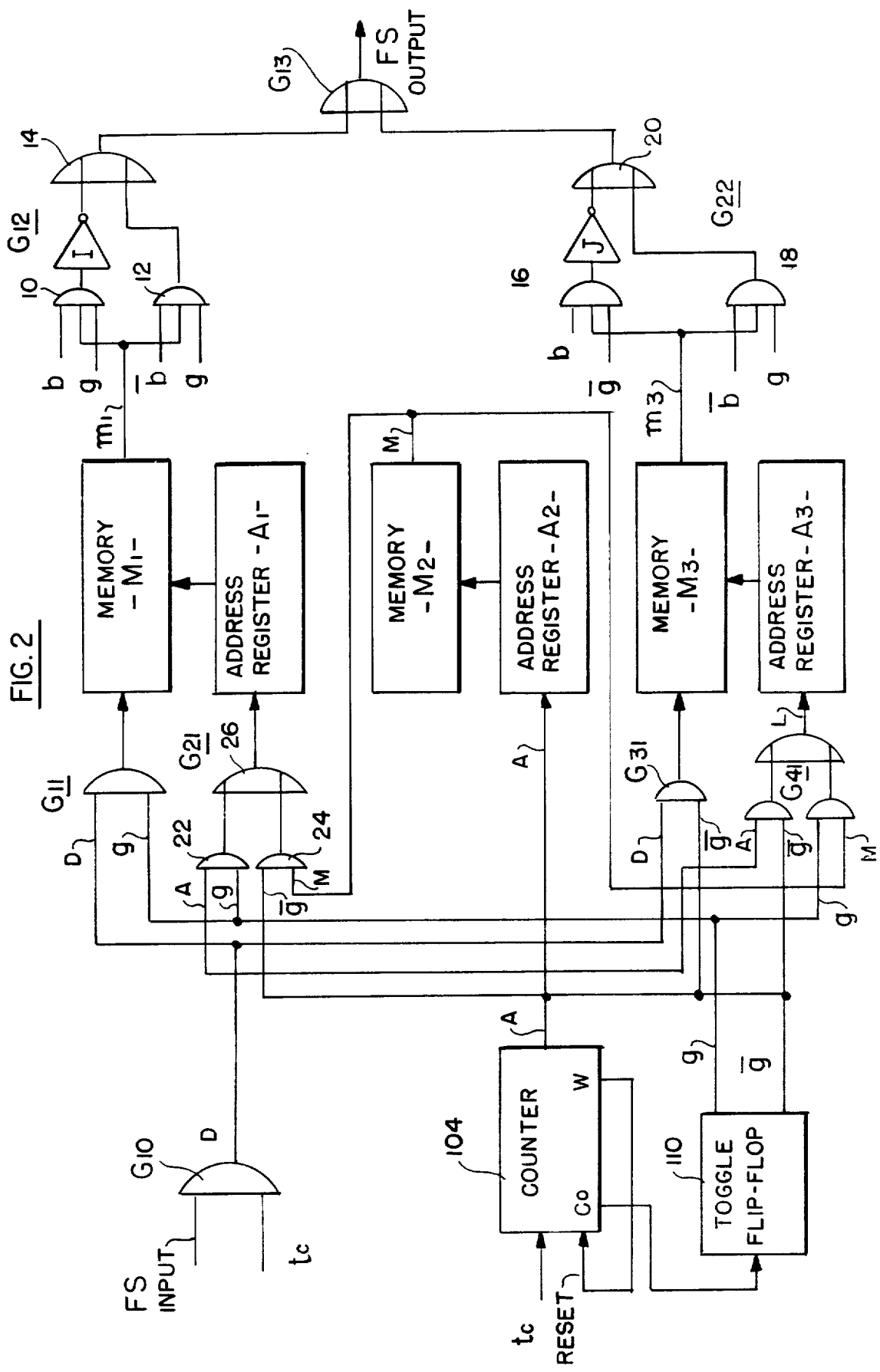
FIG. 2 is a logic block diagram of a particular embodiment of the system of the invention.

In the logic diagram of FIG. 2, the data words are fed into the format changing data processing system through an "and" gate G10 under the control of a clock signal $t_c$. The output of the "and" gate G10 is designated D, and that output is applied to two "and" gates G11 and G31. The output of "and" gate G11 is introduced to memory $M_1$, and the output of "and" gate G31 is introduced to memory $M_3$. A signal g from a toggle flip-flop 110 is applied to gate G11, and its complement $\bar{g}$ is applied to gate G31.

The state of the signal g (one or zero) determines which of the two memories $M_1$ or $M_3$ will be set to an input mode to accept input data words, and which one will be set to an output mode to produce at the output of the system a sequence of data words with a changed format as compared with the sequence of data words fed into the system. The memories $M_1$ and $M_3$ operate alternately so that when one of the memories is in its input mode the other is in its output mode, and vice versa.

The output of memory $M_1$, designated $m_1$, is applied to a gate circuit G12, and the output of gate circuit G12 is fed through an "or" gate G13 to the output of the system. The gate circuit G12 includes two "and" gates 10 and 12 to which the output $m_1$ is applied. The signal g from flip-flop 110, as well as an additional signal b are applied to the "and" gate 10; and the signals $\bar{b}$ and g are applied to the "and" gate 12. The outputs from the "and" gates 10 and 12 are applied to an "or" gate 14, with the output from "and" gate 10 being inverted by an inverter I, as shown.

The signal b occurs as a bit in each instruction A word in the memory $M_2$, and the state of that bit (one or zero) determines whether the corresponding data word M from memory $M_1$ shall be fed through "and" gate 12 to the output of the system, or whether its complement will be fed through "and" gate 10 to the output of the system. This capability of the system to provide the changed format words either in the same form as the input words, or as complements of the input words, has utility in many types of equipment utilizing the system of the invention.

The output of memory $M_3$, designated $m_3$, is applied through a gate circuit G22, and through the "or" gate G13 to the output of the system. The gate circuit G22 is similar to the gate circuit G12, as shown, and it includes two "and" gates 16 and 18, an "or" gate 20 and an inverter I. The signals $m_3$, b and $\bar{g}$ are applied to gate 16, and the signals $m_3$, $\bar{b}$ and $\bar{g}$ are applied to gate 18.

Instructions A from a counter 104 are applied to the address register $A_2$ associated with memory $M_2$, and the instructions A are also applied to gate circuits G21 and G41. Gate circuit G21 supplies an output $\bar{L}$ to address register $A_1$, and gate circuit G41 supplies an output L to address register $A_3$.

Gate circuit G21 includes two "and" gates 22 and 24, with the signal A being applied to one of the "and" gates and the output M from memory $M_2$ being applied to the other "and" gate. One of the "and" gates is controlled by the signal g from the flip-flop 110, and the other is controlled by its complement $\bar{g}$. The outputs of the two "and" gates 22 and 24 are passed through an "or" gate 26 to provide the signal $\bar{L}$.

Gate circuit G21 provides that during the input mode of memory $M_1$ successive data words D fed into the system are stored at sequential address locations in memory $M_1$, under the control of successive instructions A derived from the counter 104. Gate circuit G21 also provides that during the output mode of memory $M_1$, the output words $m_1$ from memory $M_1$ are fed to the output of the system in a changed format sequence, under the control of instructions from $M_2$.

The gate circuit G41 is similar to the gate circuit G21, but the application of the signal g and $\bar{g}$ to its "and" gates is reversed, as compared with the application of those signals to the "and" gates in gate circuit G21. The same control as described above, accordingly, is exerted on memory $M_3$, but on an alternate basis with respect to the control exerted on memory $M_1$.

The instructions A from the "or" gate 102 are introduced sequentially into the address register $A_2$ connected to memory $M_2$ at all times during the operation of the system. Accordingly, a sequence of instructions M previously stored in memory $M_2$ are introduced to address register $A_1$ during the output mode of memory $M_1$ and are introduced to register $A_3$ during the output mode of memory $M_3$.

As mentioned above, the instruction words in memory $M_2$ may be provided with an extra bit (b) (or several extra bits). The state of the extra bit b (one or zero) may then be used to alter the output words from the memories $M_1$ or $M_3$. For example, and as described above, if the extra bit denoted (b) is a "one" gate circuits G12 and G13 cause the complements of the data words to pass to the output of the memory system. When the extra bit (b) is a "zero", the actual data words then pass to the output of the system.

To summarize, gate circuits G11 and G31 of FIG. 2 determine which of the memories $M_1$ or $M_3$ is to receive the input data words; and gate circuits G12 and G22 determine which of the memories $M_1$ or $M_3$ is to transmit the changed format sequence of data words to the output of the system. Gate circuits G12 and G22 also determine whether the actual data words, or their complements, are to be passed to the output of the system, as determined by the state of bit (b). The gate circuits G21 and G41 determine whether an address A or an address M is to be introduced to the address registers $A_1$ and $A_3$.

A counter 104 serves to generate the instructions A which are introduced serially into the register $A_2$, so that appropriate instructions may be retrieved from the memory $M_2$ and introduced to the register $A_1$ or $A_3$ for selecting and storing words in the memory $M_1$ or $M_3$ when that particular memory is in its input mode. Counter 104 is stepped by clock $t_c$ from an initial count $C_0$ and a count W. The number of counts of counter 104 correspond to the number of words stored in the memories $M_1$, $M_2$ and $M_3$. The successive configurations of counter 104 as it counts from $C_0$ to W constitutes the addresses A. These addresses are introduced to address register $A_2$, as mentioned above, so that the appropriate instructions may be selected from memory $M_2$ and passed to the address register $A_1$ and $A_3$ when the memory $M_1$ or $M_3$ is in its output mode. When counter 104 reaches the W count, it is reset to its initial count $C_0$, and repeats the count. Specifically, when the counter 104 reaches its W count, a pulse appears on the lead designated W to reset the counter. The counter is then reset to its $C_0$ count. When that occurs, a pulse appears on the lead designated $C_0$ and serves to toggle a flip-flop 110. When flip-flop 110 is in its set state, the signal g enables the "and" gate 22, so that the addresses A may be introduced to address register $A_1$ associated with memory $M_1$, which occurs when the memory $M_1$ is in its input mode. When the flip-flop 110 is reset, the signal $\bar{g}$ is introduced to the gate circuit G41 so that the addresses A may be passed to the address register $A_3$ associated with memory $M_3$ when the memory $M_3$ is in its input mode.

Accordingly, during the operation of the data processing system of FIG. 2, while input words are being stored in memory $M_1$, memory $M_3$ is producing output words with a changed format, in accordance with the instructions derived from memory $M_2$. When all of the words stored in memory $M_3$ have been outputed, W words are stored in memory $M_1$, and the roles of the two memories is reversed, so that now memory $M_1$ provides output words with a changed format, and memory $M_3$ responds to input words.

The invention provides, therefore, a format changing data processing system which responds to a serial input to provide an uninterrupted serial output with changed sequential format, as compared with the secuence of the input. As described, the output words may correspond to the input words, or may be the complements of the input words if so desired.

It is to be understood that memory $M_2$ may be used to control other memories in addition to memories $M_1$, and $M_3$. For example, it is possible that data could be transmitted simultaneously from several sources and could similarly be transmitted to respective data handling equipment so that the formats of several records could be changed at once. Also, one or more memories may contain program data which specify changes in the memory output words, or possibly other operations, so that the addresses of these memories would be the successive words from memory $M_2$.

It will be appreciated that while a particular embodiment of the invention has been shown and described, modifications may be made. It is intended in the claims to cover all modifications which come within the true spirit and scope of the invention.

I claim:

1. A data processing system for producing a series of output data words in response to a series of input data words, with the output data words having a different sequential format as compared with the sequential format of the data input words, said system comprising: a first memory for storing the input data words; a first address register connected to said first memory; a second memory for storing instruction words relating to the retrieval of the data words from said first memory; a second address register connected to said second memory; address generating circuitry connected to said second address register for generating successive address words and for sequentially introducing said successive address words to said second address register; first logic circuitry connected to said address generating circuitry for causing said successive address words to be sequentially introduced to said first address register during an input operational mode of said first memory; second logic circuitry connected to said first memory to pass the input data words sequentially to said first memory during said input operational mode; third logic circuitry for disabling said first logic circuitry and for causing instruction words to be sequentially introduced to said first address register from said second memory during an output operational mode to retrieve data words from said first memory in a sequence determined by said instruction words; and fourth logic circuitry connected to said first memory for causing data words retrieved from said first memory by said instruction words to pass out of the system as said output data words during said output operational mode.

2. The data processing system defined in claim 1, and which includes a third memory and a third address register connected to said third memory; and in which said first, second, third and fourth logic circuitry causes said third memory to operate in alternation with said first memory, said third memory having an input operational mode when said first memory has an output operational mode, and said third memory having an output operational mode when said first memory has an input operational mode, so as to provide uninterrupted operation of said system.

3. The system defined in claim 1, in which said first and second memories are random access memories 4. The system defined in claim 2, in which said first, second and third memories are random access memories 5. The system defined in claim 1, in which said address generating circuitry includes a counter.

6. The system defined in claim 5, and which includes a flip-flop connected to said counter and to said logic circuitry for establishing said operational modes.

* * * * *